United States Patent
Oberländer

[15] 3,645,418
[45] Feb. 29, 1972

[54] PRESSURE COOKER SAFETY DEVICE

[72] Inventor: Karl-Oskar Oberländer, Geislingen am Steige, Germany

[73] Assignee: Wurttembergische Metallwarenfabrik, Geislingen am Steige, Germany

[22] Filed: July 14, 1970

[21] Appl. No.: 54,705

[30] Foreign Application Priority Data

July 17, 1969 Germany...................P 19 36 505.0

[52] U.S. Cl. .........................220/55.3, 220/40 S, 220/55 PC
[51] Int. Cl. ...................................A47j 27/08, B65d 45/00
[58] Field of Search...........................220/55.3, 55 PC, 40 S

[56] References Cited

UNITED STATES PATENTS

| | | | |
|---|---|---|---|
| 2,584,759 | 2/1952 | Swenson | 220/55.3 X |
| 3,559,839 | 2/1971 | Seethaler | 220/55 PC |

FOREIGN PATENTS OR APPLICATIONS

| | | | |
|---|---|---|---|
| 1,334,877 | 7/1963 | France | 220/40 S |

Primary Examiner—George T. Hall
Attorney—Luc P. Benoit

[57] ABSTRACT

A safety device for a steam pressure cooker has a gasket lifter mechanism for selectively lifting the sealing gasket of the pressure cooker to provide for an escape of steam prior to each opening of the cooker, and preferably also whenever the cooker lid is incorrectly positioned relative to the cooking vessel.

21 Claims, 10 Drawing Figures

INVENTOR
KARL-OSKAR OBERLANDER
BY
ATTORNEY

Fig. 9
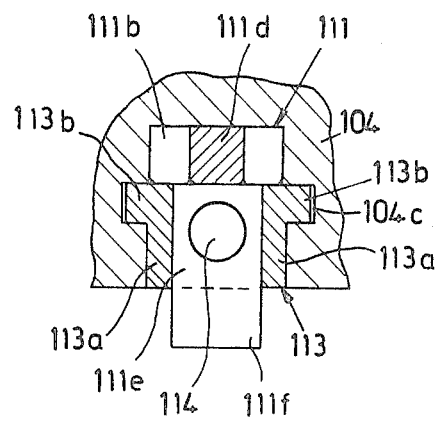
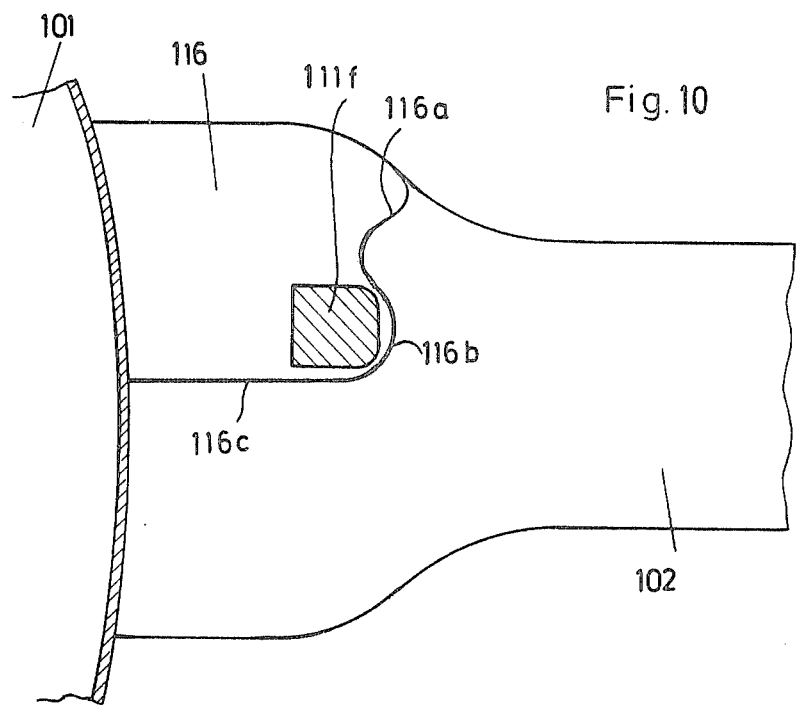
Fig. 10

PRESSURE COOKER SAFETY DEVICE

BACKGROUND OF THE INVENTION

1. Field of the Invention

The subject invention relates to cooking vessels and, more particularly, to safety devices for steam pressure cookers.

2. Description of the Prior Art

There is known a pressure cooker type in which the lid and the rim of the cooking vessel are in a conventional manner provided with mutually spaced claws which in the locking position of the cooker interfit in the manner of a bayonet catch. The safety device of this known cooker has a bolt which is mounted in the lid handle for radial movement relative to the cooker lid, and which is biased by a spring in a direction toward the lid rim. In that quiescent state, a lug provided on the bolt projects through an opening in the lid rim and lifts the sealing gasket of the cooker from the sealing surface.

This known safety device is arranged at the location of a claw of the cooker lid. A plurality of claws of the cooking vessel have inclined lateral edges on which the lower part of the lug of the safety device travels during rotation of the lid in locking position. In this manner, the lug is pressed against its spring bias away from the lid rim and thus permits an engagement of the sealing gasket with the sealing surface. This process is reversed during opening of the lid, so that the lug of the safety device relifts the gasket whereby pressurized steam in the cooker which is still present at the time of opening of the cooker can escape therefrom.

These known steam pressure cookers have several disadvantages. To be sure, it is provided that the lid handle in the lid locking position shall be in registry with the vessel handle; and the lug of the safety device will in that position with certainty engage a vessel claw, thereby enabling a rise in steam pressure. However, there is no locking device which prevents the lid from being attached to the vessel in an incorrect position in which the lid and vessel claws are also able to interfit rotationally. Since a rise in steam pressure is also possible in that incorrect position, there is no guarantee of safe operation despite the provision of a dog which laterally defines a radial edge as a catch against rotation in the wrong direction.

Moreover, it is possible with this known cooker type that steam pressure can already build up when the lug of the safety device has reached the end region of an inclined claw edge while the vessel and lid claws are insufficiently interlocked. This is particularly the case when the lid is positioned on the vessel at an angular displacement of the lid handle and the vessel handle which exceeds the specified value; as well as when the lid is rotated in the wrong direction, which is possible when not all vessel claws are provided with catch edges and the lid is positioned at an excessive angular displacement.

In these cases, the rising steam pressure blasts the lid off the vessel.

The required safety against opening under pressure is even lacking when the lid has been correctly positioned and locked. To be sure, the lug of the safety device slides immediately into lifting position upon opening in the correct rotational direction, but the claws are disengaged and the lid is released during a rapid rotational movement, which is not impeded in any manner, before even a portion of the pressure differential has a chance to equalize itself.

In that case, the lid is also blasted upwardly whereby a danger of considerable injury to the operator exists. If this rapid opening is effected by lid rotation in the wrong direction, which is not inhibited in any manner, the claws are practically completely disengaged before any pressure equalization can take place, since the lug of the safety device is then only in the last moment capable of sliding into lifting position. The power with which the lid is blasted off is then even greater.

Further models of the initially mentioned type are known in which the safety device also has a pressure element which acts through an opening in the lid rim on the sealing gasket and which is slidably mounted in the lid handle and is coupled with a locking element. The safety device of these known appliances operates in such a manner that the pressure element in its rest position does not lift the gasket seal, but is moved into lifting position upon actuation of the locking element as is necessary for an opening of the lid from the locking position. In this manner, steam pressure which is still present in the cooker already becomes noticeable through escaping steam prior to the initiation of the rotary lid motion, and the largest part of the pressure is decreased by the time the lid has been rotated in the unlocked position. Accordingly, those safety devices largely avoid an opening of the cooker under pressure; but they are unable to eliminate the possibility of a lid placement in an incorrect position so that steam pressure can rise while the locking elements are insufficiently engaged resulting in a forceful blasting off of the lid either instantly or during the opening of the cooker.

SUMMARY OF THE INVENTION

The subject invention avoids these disadvantages and materially improves the safety of pressure cookers, as will become apparent in the course of this disclosure.

From one aspect thereof, the subject invention provides a safety device for a steam pressure cooker, which steam pressure cooker comprises a cooking vessel, a lid connectable to and selectively removable from the cooking vessel, a sealing surface and a gasket engaging the sealing surface for releasably sealing the lid relative to the vessel.

The safety device under consideration comprises, in combination with the pressure cooker, first means operatively associated with the gasket for selectively lifting the gasket from the sealing surface to permit the escape of steam from the vessel, and second means connected between the lid and cooking vessel for locking the lid against removal from the cooking vessel within a locking range and for selectively releasing the lid for removal from the vessel.

The safety device under consideration further includes third means connected to the first and second means for actuating the first means to lift the gasket from the sealing surface prior to each release by the second means of the lid for removal from the vessel, and fourth means operatively associated with the gasket for selectively lifting the gasket from the sealing surface to permit the escape of steam from the vessel in response to displacement of the second means relative to the locking range.

It will be recognized that the safety device under consideration permits only then a sealing engagement of the gasket with its sealing surface when the lid of the cooker is correctly positioned and locked on the cooking vessel. Operation of the subject pressure cooker is thus practically free from danger and foolproof, since even a negligent operation will not lead to explosionlike removal of the cooker lid. The safety device according to the subject invention will educate even technically inexperienced housewives to correctly position the lid on the vessel, since there is only one specific lid position in which the requisite steam pressure can develop.

From another aspect thereof, the subject invention provides a safety device for a steam pressure cooker of the type mentioned above in the subject summary.

This safety device comprises, in combination with the pressure cooker, first means operatively associated with the gasket for selectively lifting the gasket from the sealing surface to permit the escape of steam from the vessel, and second means connected between the lid and cooking vessel for locking the lid against removal from the cooking vessel within a locking range and for selectively releasing the lid for removal from the vessel, as well as third means connected to the first and second means for actuating the first means to lift the gasket from the sealing surface prior to each release by the second means of the lid for removal from the vessel.

The latter safety device may advantageously be employed where considerations of economy and space are of importance. To be sure, this safety device omits the above-mentioned fourth means and their safety function. However, it still provides a considerable margin of safety relative to prior art devices, since pressurized steam is positively caused to escape from the vessel when the lid is unlocked from its correct position on the vessel.

BRIEF DESCRIPTION OF THE DRAWINGS

The invention will become more readily apparent from the following detailed description of preferred embodiments thereof, illustrated by way of example in the accompanying drawings, in which:

FIG. 9 is a stepped section along the line IX—IX in FIG. 7; and

FIG. 10 is a fractional top view of a vessel and vessel handle along the line X—X in FIG. 7.

DESCRIPTION OF PREFERRED EMBODIMENTS

Figure 1:
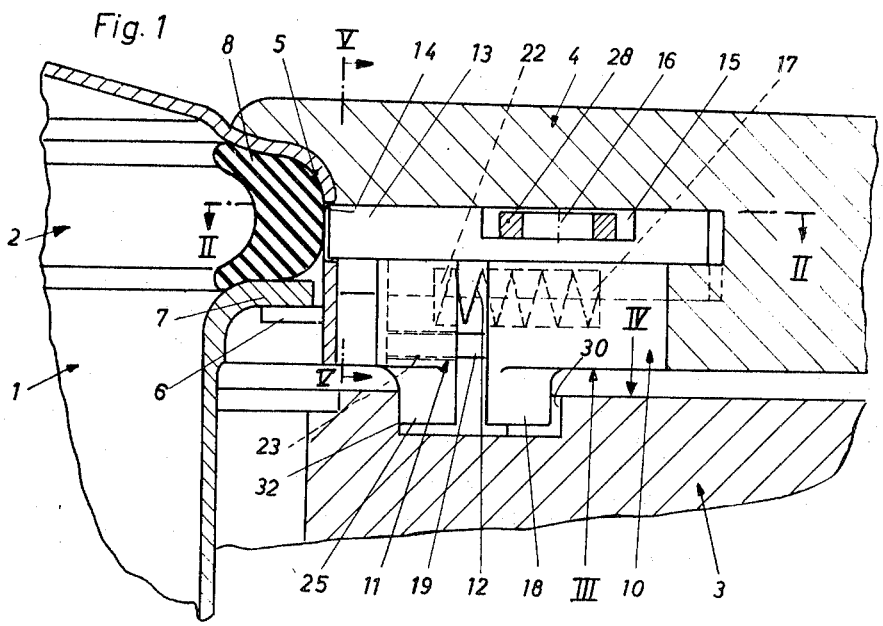
FIG. 1 is a sectional and fractional detail view of a steam pressure cooker in accordance with an embodiment of the subject invention, and along the line I—I in FIG. 2.

The FIGS. 1 to 5 illustrate a pressure cooker comprising a cooking vessel 1 and a lid 2. In the interest of a magnified and improved illustration, only fractions of the vessel 1 and lid 2 and of associated handle structures are shown, inasmuch as the parts which are not specifically illustrated may be of conventional design.

A stem-shaped handle 3 is attached to the vessel 1, and a stem-shaped handle 4 is attached to the lid 2. The figures under consideration show the pressure cooker in its closed condition. In this condition, the lid 2 is locked on the vessel 1 by peripherally distributed claws 6 and 7, only one pair of which is shown. The claws 6, which reach under the claws 7, are formed by inwardly bent portions of the rim 5 of the lid 2. The claws 7, on the other hand, are formed by outwardly bent portions of the vessel 1. An annular gasket 8 of rubber or rubberlike material rests in the lid rim 5 to seal the vessel 1 and lid 2 relative to one another so as to permit a rise of pressure in the cooker.

The lid handle 4 carries a safety device which is located in a recess 9 of that handle, and which comprises a first slide 10, a second slide 11, a compression spring 12 and an actuator 37. A lug of the first slide 10 provides a first lifting element 13 which enters a corresponding opening 14 in the lid rim 5. The slide 10 further carries a bolt 16 in a stepped recess 15 at one of its surfaces. A bore 17 is provided at a median portion of the slide 10 and the compression spring 12 is with its one end slidably inserted into that bore 17. A locking element 18 is formed by a plug projecting from the lower side of the first slide 10 and beyond the lower surface of the lid handle 4. The locking element 18 is semicircularly shaped at the side thereof which faces away from the lid 2. A lug 19 projects from the median portion of the slide 10 at a location below the spring-receiving bore 17. The lug 19 substantially extends in parallel to the lifting element 13, but for a shorter distance.

The second slide 11 has in its upper region a lug which forms a second lifting element 20 that enters a corresponding opening 21 in the lid rim 5. A bore 22 for receiving the second end of the spring 12 is located in a median portion of the second slide 11. A recess 23 for receiving the lug 19 is located in the second slide 11 adjacent the bore 22. Two parallel slide bars 24 (see FIG. 3) project from the median portion of the slide 11 in a direction away from the second lifting element 20. A control element 25 is located below the median portion of the slide 11 and projects therefrom to below the lid handle 4. The control element 25 is semicircularly shaped at the side thereof which faces toward the lid 2.

Figure 2:
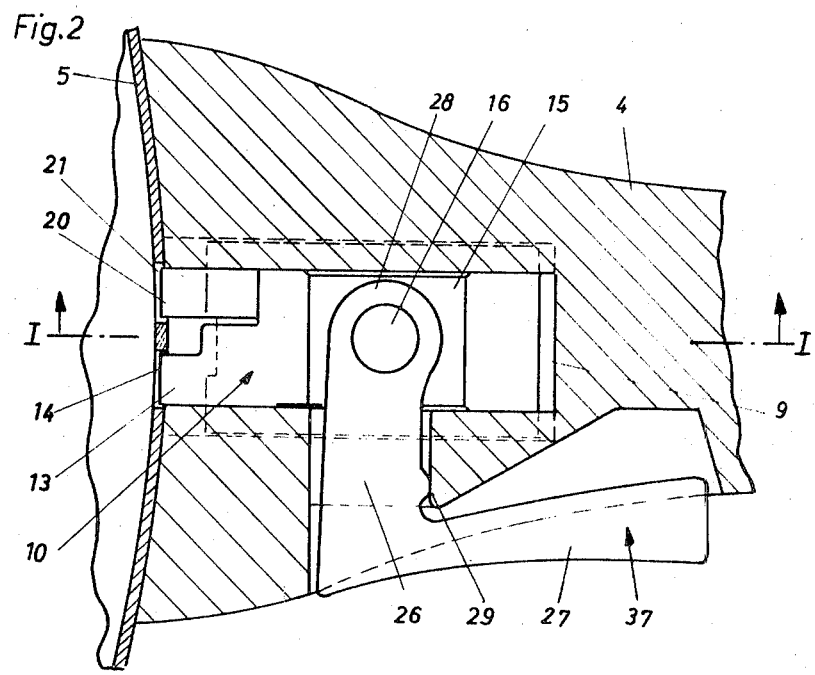
FIG. 2 is a section along the line II—II in FIG. 1.
Figure 3:
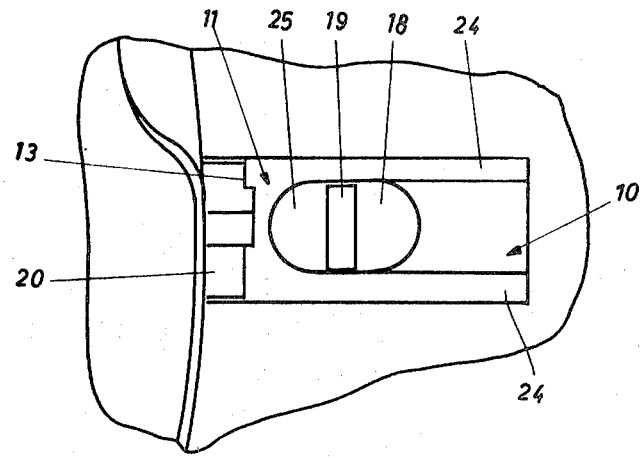
FIG. 3 is a fractional bottom view of a lid and lid handle in the direction of the arrow III in FIG. 1.

As shown in FIG. 2, the actuator 37 has two arms 26 and 27. The arm 26 has an eye 28 by means of which the actuator 37 is pivotally mounted on the bolt 16 of the first slide 10. The other arm 27 is shaped in the nature of a piano key and projects laterally from the handle 4. The actuator 37 is supported relative to a wall of the handle recess 9 by means of a bearing surface 29 about which the actuator is tiltable.

The safety device under discussion may be mounted in the lid handle 4 in the following manner:

At first the actuator 37 is inserted from the side and the first slide 10 from below, whereby the bolt 16 is inserted into the eye 28. The spring 12 is then inserted into the bore 17 of the first slide 10. Thereafter, the second slide 11 is inserted from the end of the handle 4 adjacent the lid 2, whereby its sliding bars 24 (see FIG. 3) come to bear bilaterally at the median portion of the first slide 10. The free end of the spring 12 enters thereby the bore 22, and the lug 19 moves into the recess 23. If now the handle 4 is attached to the lie 2, then the compression spring 12 moves the first slide 10 against the end of the handle recess 9 which is remote from the lid 2. At that time the second lifting element 20 reaches through the opening 21 and presses the gasket 8 away from its sealing surface.

Figure 4:
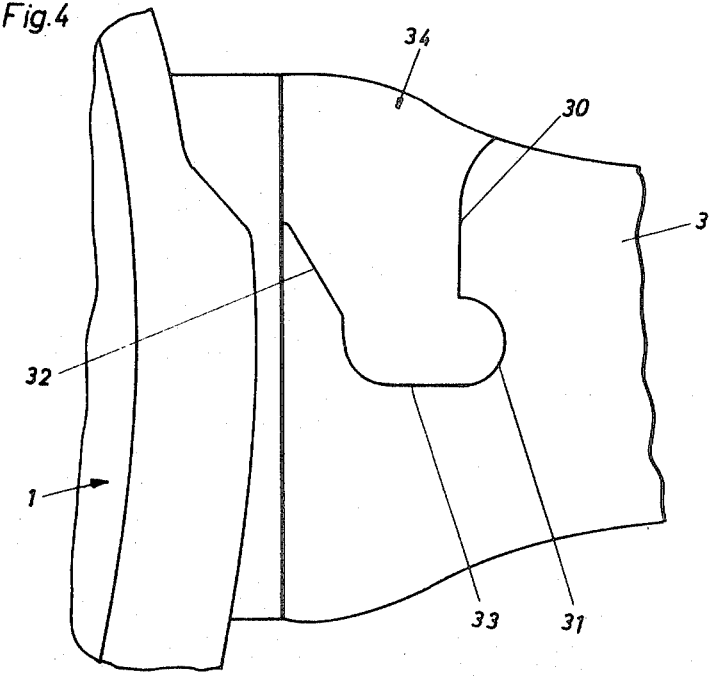
FIG. 4 is a fractional top view of a vessel and vessel handle in the direction of the arrow IV in FIG. 1.
Figure 5:
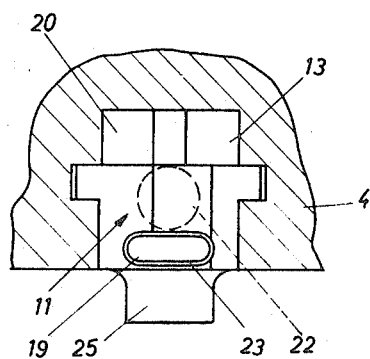
FIG. 5 is a section along the line V—V in FIG. 1.

A first control cam 30 (see FIG. 4) at the upper side of the vessel handle 3 cooperates with the locking element 18 of the first slide 10, and defines a register notch 31. A second control cam 32, which projects in a direction toward the registry notch 31, cooperates with the control element 25 of the second slide 11. A striker bar portion 33 extends between the cams 30 and 32, as shown in FIG. 4. This striker bar portion and cams with registry notch are provided by the outline of a recess 34 in and at the upper surface of the vessel handle 3.

The safety device and the control cams under discussion cooperate as follows:

The spring 12 effects by means of the second lifting element 20 in the above-mentioned manner a lifting of the gasket 20 from its sealing surface as long as the lid 2 is removed from the vessel 1 or as long as the lid handle 4 is out of registry with the vessel handle 3. When the handles 3 and 4 move into registry during rotation of the lid 2 into the locking position, the locking element 18 slides with its rounded surface along the first control cam 30. In consequence, the first slide 10 is moved against the bias of the compression spring 12 in a direction toward the lid rim 5, and the first lifting element 13 is pressed through the opening 14 against the gasket 8. The lifting elements 13 and 20 thus lift the gasket 8 from its sealing surface. The second control cam 32 only starts to act on the control element 25 after the latter lifting operation; with such action also taking place against the bias of the compression spring 12, whereby the second slide 11 is moved away from the lid rim 5 and the second lifting element 20 is withdrawn from the gasket 8. Similarly, the compression spring 12 again presses the first slide 10 in a direction away from the lid rim 5 as soon as the locking element 18 comes to rest in the registry notch 31 (see FIG. 4); with the second cam 32 simultaneously acting through the control element 25 to hold the second lifting element 20 remote from the gasket 8.

Accordingly, only in this position, in which the handles 3 and 4 are in registry, are both lifting elements 13 and 20 withdrawn for the gasket 8, whereby the same is seated on its sealing surface and seals the lid 2 against the vessel 1 so that pressure may be generated inside the cooker.

To provide for an opening of the sealed cooker, it is necessary to act by means of the actuator 37 via the bolt 16 on the first slide 10 so that the locking element 18 may move out of the registry notch 31. This is done by depressing the key arm 27 of the actuator 37. Positively and automatically, the first lifting element 13 thereby is moved against the gasket 8 to lift the same from its sealing surface. In case there still is pressure in the cooker at the time of its opening, the steam will then escape through the opening 14, thereby alerting the operator. If the operator continues to rotate the lid despite this warning signal, the pressurized steam continues to escape, first through the opening 14, and soon through the opening 21 also, since the second cam 32 releases in the course of further rotation the second slide 11 for movement toward the lid 2 by force of the compression spring 12. In consequence, the second lifting element 20 also presses against the gasket 8.

Accordingly, the pressure inside the cooker will at least for the largest part have been exhausted by the time the locking claws 6 and 7 of lid and vessel become disengaged.

The use and provision of the single spring 12 in accordance with the illustrated embodiment further increases the safety factor of the subject device, since a breaking of that spring affects all functions of the safety device so that the operator is alerted. This spring is moreover laterally protected by the lug or tongue 19 which extends from the slide 10 into an aperture in the slide 11.

Figure 6:
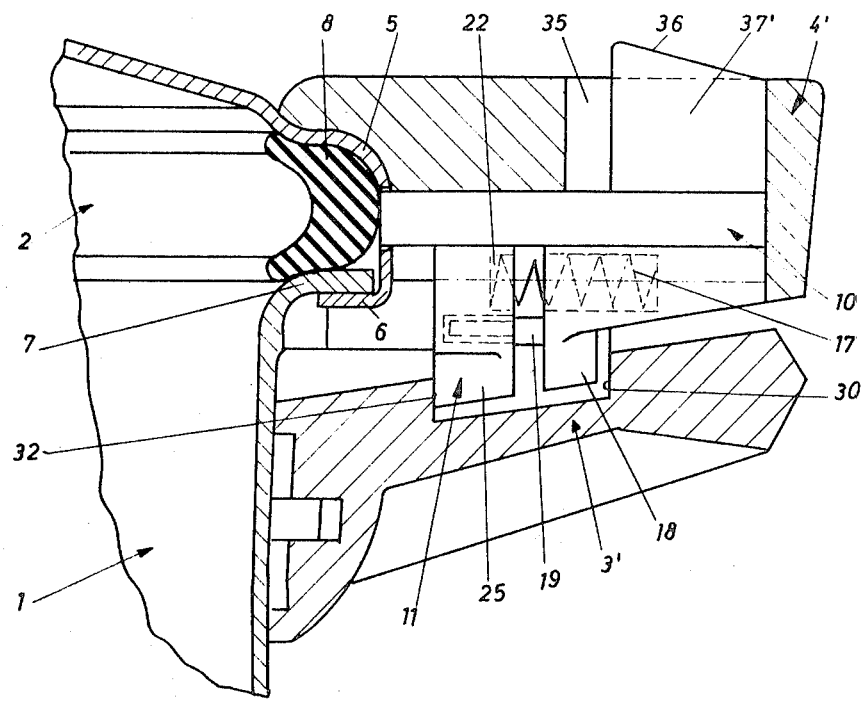
FIG. 6 is a sectional and fractional detail view of a modification of the steam pressure cooker of FIG. 1, in accordance with a further preferred embodiment of the invention.

The further embodiment of the subject invention shown in FIG. 6 distinguishes itself from the embodiment FIGS. 1 to 5 mainly by the design of the handles. Short side handles 3', one of which is seen in FIG. 6, are attached to the vessel 1 and define the above-mentioned control cams 30 and 32. Corresponding lid handles 4', one of which is seen in FIG. 6, are likewise short. For this design, a differently shaped actuator 37' is provided to save space and facilitate handling. The remaining parts of the cooker and safety device correspond moreover to their counterparts in FIGS. 1 to 5 and bear, therefore, like reference characters.

The actuator 37' is formed as a sliding grip element and is integral with the first slide 10. This actuator 37' is located at the top of the slide 10 in a region remote from the lid 2, and projects upwardly through a recess 35 of the lid handle 4'. The top surface 36 of the actuator 37' is downwardly inclined as seen in a direction toward the end of the lid handle, and forms an area of pressure application by a finger, such as the thumb, of the operator's hand that grips the lid handle during a cooker opening operation. By a displacement of the sliding grip actuator 37' in a direction toward the lid 2, the first slide 10 is moved in that same direction, whereby the unlocking and safety operations elaborately disclosed above are realized.

FIGS. 7 to 10 show a pressure cooker in accordance with a further embodiment of the subject invention. This further embodiment concerns a safety device without the above-mentioned second lifting element and associated parts, and without the safety feature of these parts outside the locking range.

Figure 7:
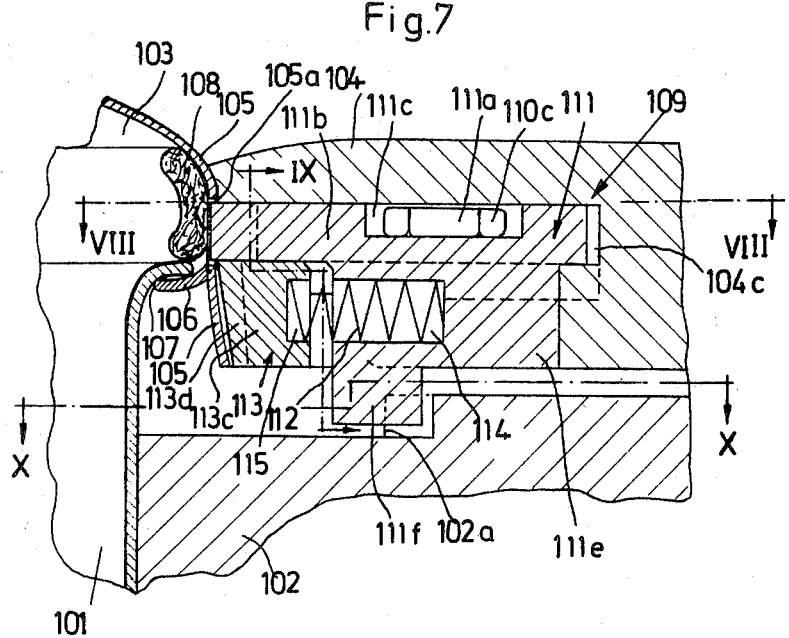
FIG. 7 is a sectional and fractional detail view of a steam pressure cooker in accordance with a further embodiment of the subject invention, and along the line VII—VII in FIG. 8.

The cooker 109 of FIGS. 7 to 10 has a stem-shaped vessel handle 102 attached to the vessel 101. The cooker is closed by means of a lid 103 to which a likewise stem-shaped lid handle 104 is attached. FIG. 7 shows the cooker in a closed position in which claws 106, which are bent out of the lid rim 105 and one of which is seen in the figure, reach under corresponding claws 107 at the rim of the vessel 101 and lock the lid onto the vessel. An annular gasket 108 of rubber or rubberlike material is seated in the lid rim 105 and seals the lid 103 and the vessel 101 relative to one another so as to permit a rise of pressure in the cooker. A safety device 109 is located in the lid handle 104. This device 109 comprises four parts which fit together without additional fasteners or connecting elements. These four parts comprise an actuator 110, a slide 111, a spring 112 and a guide 113. Each of the actuator 110, slide 111 and guide 113 is a single injection-molded plastic piece.

Figure 8:
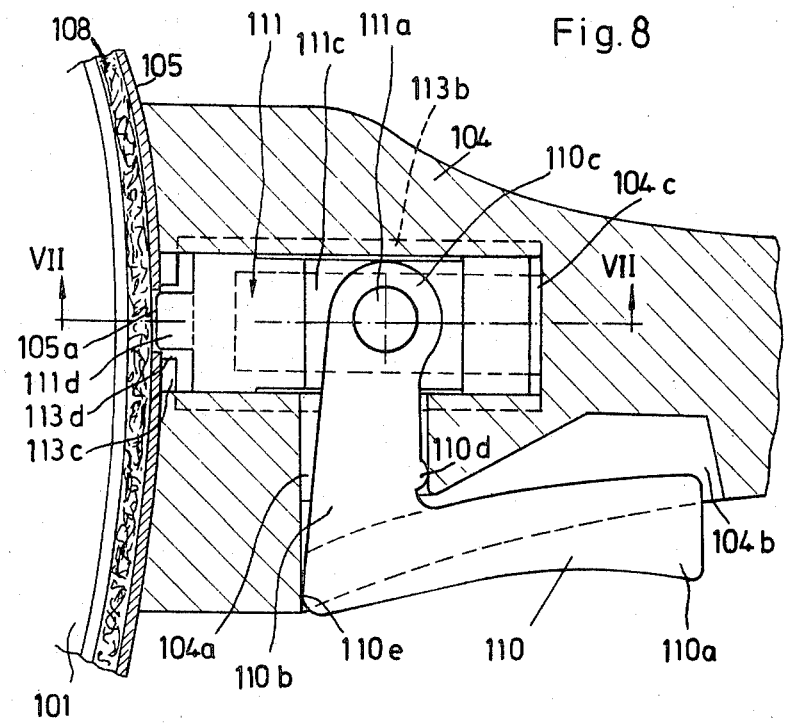
FIG. 8 is a section along the line VIII—VIII in FIG. 7.

As seen in FIG. 8, the actuator 110 is substantially horizontally located in a slot-shaped recess 104a of the lid handle 104. This actuator 110 has two angularly disposed arms 110a and 110b. The arm 110a is key shaped and projects laterally from the lid handle 104 in the quiescent state of the safety device 109 shown in the drawings. The second arm 110b has a thickness which is considerably smaller than that of the arm 110a, so that a step shown in dotted outline in FIG. 8 is present at the lower side of the actuator 110. The arm 110b terminates in an eye 110c by means of which the actuator is pivotally mounted on a bolt 111a of the slide 111. A lateral protrusion 110b of the arm 110b supports the actuator at a wall portion of the slit 104a for tilting movement, so that the key-shaped arm 110a may be swung into a recess 104b adjacent the slit 104a. In its quiescent position the actuator 110 rests with a point 110c in the region of its outer angular apex also against a wall portion of the slit 104a.

In its upper region the slide 111 has a substantially the shape of a rectangular plate 111b with a stepped recess 111c into which the bolt 111a extends. The plate 111b terminates at its side which is adjacent the lid rim in a lug 111d (see FIG. 9) which serves as a pressure element and which extends into an opening 105a in the lid rim 105. An omnilaterally recessed centerpiece 111e is annexed to the lower side of the plate 111b and has a bore 114. An end portion of a spring 112 is supported in the bore 114.

A projection 111f is formed at the lower side of the centerpiece 111e and projects downwardly beyond the lid handle 104 to cooperate as a locking element with the guiding cam 116a of the vessel handle 102. As seen in FIG. 10, the projection 111f is rounded off at its back side.

The guide 113 retains the slide 111 in a substantially oblong recess 104c of the lid handle 104. The recess 104c extends in the direction of the center axis of the lid handle 104, but is laterally offset from such center axis for space-saving purposes.

The guide 113 has a substantially U-shaped plan view which is shown in FIG. 8 in dotted outline. It is composed of two slide bars 113a with shoulders 113b and an interconnecting bight portion 113c which rests with a projection 113d against the lid rim 105. The shoulders 113b rest in corresponding elongate notches of the recess 104c. The plate 111b is slidable on the bars 113a and the centerpiece 111e of the slide 111 is slidable therebetween. A bore 115 at the side of the bight portion 113c which faces away from the lid rim is in alignment with the bore 114 of the slide 111. The other end of the spring 112 is located therein.

FIG. 10 shows part of the top surface of the vessel handle 102, together with a section of the projection 111f which cooperates as a locking element with the guiding cam 116a. The guiding cam 116a, a registry notch 116, and a shoulder 116c which proceeds to the rim of the vessel 101 are formed by the outline of a recess 116 in the top side of the vessel handle 102. The projection 111f cannot laterally be moved in the rest position of the safety device 109 shown in FIGS. 7 and 8. Accordingly, the projection 111f locks the lid 103 against rotary movement relative to the vessel 101.

The illustrated safety device 109 is assembled in the following manner:

The actuator 110 is laterally inserted through the slit 104a while the top side of the lid handle 104 is preferably oriented downwardly. The slide 111 is inserted from above (i.e., through the lower side of the lid handle 104) into the recess 104c so that the bolt 111a engages the eye 110c of the actuator 110. The spring 112 is first inserted into the bore 114 from the side of the lid handle which is to be attached to the lid rim. The guide 113 is then inserted in the same direction into the recess 104c, whereby the free end of the spring 112 is supported in the bore 115 of the bight portion 113c. The spring 112 holds the guide 113 in a position in which it projects beyond the outline of the lid handle at the mounting side. When the lid handle 104 is attached to the lie 103, the bight portion 113c comes to rest with its projection 113d at the lid rim 105. The spring 112 is compressed. After the lid handle has been attached to the lid, all parts of the safety device 109 are supported in the position shown in the drawing, without a necessity of additional fastening elements.

The safety device 109 corresponds in terms of construction and operation largely, in particulars even identically, to the parts of the safety device of FIGS. 1 to 5 comprising the first slide 10, the first lifting element 13, the locking element 18 and the actuator 37. A detailed elaboration of the operation of the safety device 109 is, therefore, unnecessary. The sliding movement of the rounded-off back side of the projection 111f during positioning and rotation of the lid may be sufficient to provide for such a compression of the spring 112 that the projection 111f snaps into the registry notch 116b without an actuation of the actuator 110. If the contents of the cooker are hot, whereby pressure forms immediately when the lid is positioned, an actuation of the actuator 110 facilitates, however, the requisite rotary motion.

The invention is not limited in its scope to the illustrated embodiments. The slide, the lifting elements and the control cams may with the same cooperative relationship assume other forms of execution. It is particularly possible to provide an embodiment in which both slides are so interfitted that a first one of the lifting elements is tubularly hollow, while the second lifting element is slidable in the first lifting element. In this case it is only necessary to provide one opening in the lid rim whereby the overlapping lifting action of the lifting elements is unimpaired.

For a set of pressure cookers which have a common lid and an interlocking structure, which cooperates with the lid and is attachable to the cooking vessel, it is possible to provide in the lid handle a safety device according to the invention, and to provide the corresponding control cams or registry notches in a handle which is attached to the cooking vessel or to the interlocking structure.

I claim:

1. A safety device for a steam pressure cooker, which steam pressure cooker comprises a cooking vessel, a lid connectable to and selectively removable from the cooking vessel, a sealing surface and a gasket engaging the sealing surface for releasably sealing the lid relative to the vessel, said safety device comprising in combination with said pressure cooker:
   first means operatively associated with said gasket for selectively lifting the gasket from the sealing surface to permit the escape of steam from the vessel;
   second means connected between said lid and cooking vessel for locking the lid against removal from the cooking vessel within a locking range and for selectively releasing the lid for removal from the vessel;
   third means connected to said first and second means for actuating said first means to lift the gasket from the sealing surface prior to each release by said second means of said lid for removal from the vessel; and
   fourth means operatively associated with said gasket for selectively lifting said gasket from the sealing surface to permit the escape of steam from the vessel in response to displacement of said second means relative to said locking range.

2. A safety device as claimed in claim 1, wherein said fourth means include:
   gasket-lifting means movable against said gasket for lifting the gasket, and selectively movable away from the gasket for permitting engagement of the gasket with the sealing surface; and
   control cam means operatively associated with said gasket-lifting means and coupled to said cooking vessel for moving the gasket-lifting means against the gasket to lift the gasket as long as said second means are displaced relative to the locking range, and for selectively moving the gasket-lifting means away from the gasket to permit engagement of the gasket with the sealing surface upon positioning of said second means in the locking range.

3. A safety device as claimed in claim 1, wherein:
   said first means include gasket-lifting means movable against said gasket for lifting the gasket, and selectively movable said from the gasket for permitting engagement of the gasket with the sealing surface;
   said second means include locking cam means coupled between said lid and cooking vessel for locking the lid within said locking range and for selectively releasing the lid for removal from the vessel; and
   said third means include means for positively coupling said gasket lifting means to said locking cam means.

4. A safety device as claimed in claim 3, wherein said fourth means include:
   further gasket-lifting means movable against said gasket for lifting the gasket, and selectively movable away from the gasket for permitting engagement of the gasket with the sealing surface; and
   control cam means operatively associated with said further gasket-lifting means and coupled to said cooking vessel for moving the further gasket-lifting means against the gasket to lift the gasket as long as said second means are displaced relative to the locking range, and for selectively moving the further gasket-lifting means away from the gasket to permit engagement of the gasket with the sealing surface upon positioning of said second means in the locking range.

5. A safety device as claimed in claim 4, wherein:
   said locking cam means and said control cam means are constructed to permit a positioning of said gasket-lifting means and said further gasket-lifting means away from the gasket only within said locking range.

6. A safety device as claimed in claim 4, wherein:
   said pressure cooker includes a vessel handle attached to said vessel, and a lid handle attached to said lid and movable into registry with said vessel handle;
   said locking cam means include a locking cam in said vessel handle;
   said control cam means include a control cam in said vessel handle; and
   said gasket-lifting means and further gasket-lifting means, and said positive coupling means are mounted substantially in said lid handle.

7. A safety device as claimed in claim 1, wherein:
   said pressure cooker includes a vessel handle attached to said vessel, and a lid handle attached to said lid and movable into registry with said vessel handle;
   said second means include a locking cam in said vessel handle, and a first slide structure mounted in said lid handle and having a first cam follower engageable with said locking cam in the vessel handle for selectively locking and releasing the lid relative to the cooking vessel;
   said first means and at least part of said third means are integral with said first slide structure; and
   said fourth means include a control cam in said vessel handle, and a second slide structure mounted in said lid handle and having a gasket lifter, and including a second cam follower engageable with said control cam in said vessel handle for selectively moving the gasket lifter against and alternatively away from said gasket.

8. A safety device as claimed in claim 7, wherein:
   said locking cam has a registry notch for said first cam follower; and
   said control cam projects in a direction toward said registry notch.

9. A safety device as claimed in claim 7, including:
   a single spring for biasing said first and second slide structures away from one another.

10. A safety device as claimed in claim 7, including:
    manually actuable means coupled to said first slide structure for selectively actuating said first cam follower, said first means and said third means.

11. A safety device as claimed in claim 10, wherein:
    said manually actuable means include an actuating member integral with said first slide structure, and having a finger grip portion projecting from said lid handle.

12. A safety device as claimed in claim 10, wherein:
    said manually actuable means include an actuating member coupled to said first slide structure and having a key-shaped actuating member projecting laterally from said lid handle.

13. A safety device as claimed in claim 10, wherein said manually actuable means include:

a first cam pivotally coupled to said first slide structure and locally engaging a portion of said lid handle for tilting movement relative to said lid handle; and a second arm connected and extending at an angle to said first arm and defining an actuating key projecting laterally from the lid handle.

14. A safety device for a steam pressure cooker, which steam pressure cooker comprises a cooking vessel, a lid connectable to and selectively removable from the cooking vessel, a sealing surface and a gasket engaging the sealing surface for releasably sealing the lid relative to the vessel, said safety device comprising in combination with said pressure cooker;

first means operatively associated with said gasket for selectively lifting the gasket from the sealing surface to permit the escape of steam from the vessel;

second means connected between said lid and cooking vessel for locking the lid against removal from the cooking vessel within a locking range and for selectively releasing the lid for removal from the vessel; and third means connected to said first and second means for actuating said first means to lift the gasket from the sealing surface prior to each release by said second means of said lid for removal from the vessel.

15. A safety device as claimed in claim 14, wherein:

said first means include gasket-lifting means movable against said gasket for lifting the gasket, and selectively movable away from the gasket for permitting engagement of the gasket with the sealing surface;

said second means include locking cam means coupled between said lid and cooking vessel for locking the lid within said locking range and for selectively releasing the lid for removal from the vessel; and said third means include means for positively coupling said gasket-lifting means to said locking cam means.

16. A safety device as claimed in claim 15, wherein:

said pressure cooker includes a vessel handle attached to said vessel, and a lid handle attached to said lid and movable into registry with said vessel handle;

said locking cam means include a locking cam in said vessel handle defining a registry notch, and said locking cam means further include a locking element coupled to said positive coupling means and selectively insertable into said registry notch; and said gasket-lifting means and said positive coupling means are mounted substantially in said lid handle.

17. A safety device as claimed in claim 14, wherein:

said pressure cooker includes a vessel handle attached to said vessel, and a lid handle attached to said lid and movable into registry with said vessel handle;

said second means include a locking cam in said vessel handle, and a slide structure mounted in said lid handle and having an appendant locking element selectively insertable into said locking cam in the vessel handle; and said first means and at least part of said third means are integral with said slide structure.

18. A safety device as claimed in claim 17, including:

a guide for said slide structure mounted in said lid handle; and a spring between said guide and slide structure for biasing said slide structure relative to said lid.

19. A safety device as claimed in claim 17, including:

manually actuable means coupled to said slide structure for selectively actuating said locking element and positively said first means.

20. A safety device as claimed in claim 19, wherein:

said manually actuable means include an actuating member coupled to said slide structure and having a key-shaped actuating member projecting laterally from said lid handle.

21. A safety device as claimed in claim 19, wherein said manually actuable means include:

a first arm pivotally coupled to said first slide structure and locally engaging a portion of said lid handle for tilting movement relative to said lid handle; and a second arm connected and extending at an angle to said first arm and defining an actuating key projecting laterally from the lid handle.

* * * * *

PO-1050
(5/69)

UNITED STATES PATENT OFFICE
CERTIFICATE OF CORRECTION

Patent No. 3,645,418     Dated February 29, 1972

Inventor(s) Karl-Oskar Oberländer

It is certified that error appears in the above-identified patent and that said Letters Patent are hereby corrected as shown below:

Column 4, line 68, "for" should be --from--. Column 5, line 24, "of" should be inserted after --embodiment--. Column 6, line 11, "Its" should be --its--. Column 6, line 11, "a" should be cancelled. Column 6, line 67, "lie" should be --lid--. Column 7, line 70, "said" should be --away--. Column 9, line 1, "cam" should be --arm--.

Signed and sealed this 3rd day of September 1974.

(SEAL)
Attest:

McCOY M. GIBSON, JR.
Attesting Officer

C. MARSHALL DANN
Commissioner of Patents